(12) United States Patent
Fujii

(10) Patent No.: US 8,924,614 B2
(45) Date of Patent: Dec. 30, 2014

(54) HOST CONTROLLER APPARATUS, INFORMATION PROCESSING APPARATUS, AND EVENT INFORMATION OUTPUT METHOD

(75) Inventor: Mitsuru Fujii, Kanagawa (JP)

(73) Assignee: Renesas Electronics Corporation, Kanagawa (JP)

(*) Notice: Subject to any disclaimer, the term of this patent is extended or adjusted under 35 U.S.C. 154(b) by 225 days.

(21) Appl. No.: 13/532,296

(22) Filed: Jun. 25, 2012

(65) Prior Publication Data

US 2013/0007326 A1    Jan. 3, 2013

(30) Foreign Application Priority Data

Jun. 29, 2011 (JP) ................................. 2011-143828

(51) Int. Cl.
*G06F 13/24* (2006.01)
(52) U.S. Cl.
CPC .............. *G06F 13/24* (2013.01); *Y02B 60/1235* (2013.01); *Y02B 60/1228* (2013.01)
USPC .............. 710/260; 710/48; 713/320
(58) Field of Classification Search
CPC .................................. G06F 13/24; G06F 13/26
USPC ........ 710/48, 52, 61, 260, 266; 713/320, 323, 713/324
See application file for complete search history.

(56) References Cited

U.S. PATENT DOCUMENTS

| | | | |
|---|---|---|---|
| 6,877,058 B2 | 4/2005 | Sato et al. | |
| 6,990,542 B2* | 1/2006 | Nguyen | ........................ 710/260 |
| 7,617,389 B2 | 11/2009 | Nikami et al. | |
| 2009/0094397 A1 | 4/2009 | Kariya | |
| 2011/0246760 A1 | 10/2011 | Ueta | |
| 2012/0254492 A1* | 10/2012 | Li et al. | ........................ 710/269 |

FOREIGN PATENT DOCUMENTS

| | | |
|---|---|---|
| JP | 9-204311 A | 8/1997 |
| JP | 2003-202943 A | 7/2003 |
| JP | 2005-267294 A | 9/2005 |
| JP | 2009-93418 A | 4/2009 |
| JP | 2010-140266 A | 6/2010 |
| JP | 2011-9953 A | 1/2011 |
| JP | 2011-194847 A | 10/2011 |
| WO | WO 2004/046926 A1 | 6/2004 |

OTHER PUBLICATIONS

Intel Corporation, eXtensible Host Controller Interface for Universal Serial Bus (xHCI), May 21, 2010, pp. 1-468, Revision 1.0.

* cited by examiner

*Primary Examiner* — Glenn A Auve
(74) *Attorney, Agent, or Firm* — Foley & Lardner LLP

(57) ABSTRACT

The present invention aims to provide a host controller apparatus, an information processing apparatus, and an event information output method that are capable of outputting event information to a system memory while achieving power saving. A host controller apparatus according to the present invention includes: an event controller that outputs occurred event information to a system memory; and an interruption controller that outputs an interrupt signal to a CPU executing an event recorded in the system memory, the interrupt signal requesting execution of the event output from the event controller to the system memory. The event controller outputs the occurred event information to the system memory in synchronization with a timing at which the interruption controller outputs the interrupt signal to the CPU.

14 Claims, 10 Drawing Sheets

HOST CONTROLLER APPARATUS, INFORMATION PROCESSING APPARATUS, AND EVENT INFORMATION OUTPUT METHOD

CROSS-REFERENCE TO RELATED APPLICATIONS

This application is based upon and claims the benefit of priority from Japanese patent application No. 2011-143828, filed on Jun. 29, 2011, the disclosure of which is incorporated herein in its entirety by reference.

BACKGROUND

The present invention relates to a host controller apparatus that causes a processor to execute an event related to event information recorded in a system memory by outputting an interrupt signal to the processor.

A host apparatus connected to a universal serial bus (USB) device includes a USB host controller therein in order to control communication with the USB device. The host apparatus includes a notebook personal computer (hereinafter referred to as a notebook PC) or the like. Since the notebook PC may be operated using a battery, power saving is required. Accordingly, reduction in power consumption is required also in the USB host controller mounted on the notebook PC.

Japanese Unexamined Patent Application Publication No. 2003-202943 discloses detecting whether a USB device connected to a built-in slot of a host apparatus is used, and stopping output of an interrupt signal to a CPU regarding the USB device when the USB device is not used. Accordingly, it is possible to achieve reduction of power consumption of a host controller.

Japanese Unexamined Patent Application Publication No. 2009-093418 discloses that a USB host controller specifies an endpoint that requires data transfer to perform data transfer only to the endpoint that is specified. Accordingly, power consumption is expected to be reduced compared to a case in which data transfer is performed to all the endpoints that are set. The endpoint is a transferring buffer used to perform data transfer in a USB system bus.

Japanese Unexamined Patent Application Publication No. 11-194847 discloses selecting one of a system reset signal and a resume reset signal, and supplying the selected signal to a USB host controller. The system reset signal is a signal to reset the whole computer system when a power supply to the computer system is initially turned on. The resume reset signal is a signal generated when the mode is returned to a normal state from a suspend state, and is a signal to reset a device whose power is OFF due to the suspend state. By switching these signals, the state can be returned to a normal state by using the resume reset signal when the power supply of the USB host controller is OFF. Accordingly, low power consumption of the USB host controller may be achieved.

As described above, various techniques are used to achieve power saving of the USB host controller.

Extensible Host Controller Interface for Universal Serial Bus (xHCI) Revision 1.0, Intel Corporation, May 21, 2010 discloses that an extensible Host Controller Interface for Universal Serial Bus (xHCI)-compliant USB host controller updates Event Ring on a system memory upon occurrence of events. For example, the events include changes of connection status due to disconnection of a USB device connected to Down Port, for example. After updating the Event Ring, the USB host controller outputs an interrupt notification to a CPU to request processing. However, a predetermined time interval defined by Interrupt Moderation (hereinafter referred to as an IMOD) needs to be provided between outputs of the interrupt notification from the USB host controller to the CPU. Accordingly, the USB host controller outputs the interrupt notification after a lapse of IMOD time when IMOD time does not elapse after the output of the previous interrupt notification.

SUMMARY

The USB host controller stops clocks in the host controller in order to reduce power consumption, and when the system bus is PCI Express, executes a power saving mode to make a transition from Link State to L1, for example. The USB host controller disclosed in extensible Host Controller Interface for Universal Serial Bus (xHCI) Revision 1.0, Intel Corporation, May 21, 2010 is required to access the system memory to update the Event Ring. Thus, the USB controller repeats operations of returning to the normal mode from the power saving mode every time an event occurs, updating the Event Ring, and then again returning to the power saving mode.

However, events occurred on the USB host controller occur asynchronously with IMOD. Thus, the update of the Event Ring is performed irregularly. The CPU starts processing of the event at a timing at which the interrupt signal is output after a lapse of the IMOD time. Thus, the power saving mode is canceled every time the Event Ring in IMOD time is updated, which causes a problem that power is wasted in the USB host controller.

A first aspect of the present invention is a host controller apparatus including: an event controller that outputs occurred event information to a system memory; and an interruption controller that outputs an interrupt signal to a processor executing an event recorded in the system memory, the interrupt signal requesting execution of the event output from the event controller to the system memory, in which the event controller outputs the occurred event information to the system memory in synchronization with a timing at which the interruption controller outputs the interrupt signal to the processor.

By using such a host controller apparatus, the occurred event information can be output to the system memory in synchronization with a timing at which the interrupt signal is output to the processor. Accordingly, it is possible to reduce a frequency to access the system memory caused by the output of the event information, thereby being able to achieve power saving in the host controller apparatus.

A second aspect of the present invention is an information processing apparatus including: an event controller that outputs occurred event information to a system memory; and an interruption controller that outputs an interrupt signal to a processor executing an event recorded in the system memory, the interrupt signal requesting execution of the event output from the event controller to the system memory, in which the event controller includes: a host controller apparatus that outputs the occurred event information to the system memory in synchronization with a timing at which the interruption controller outputs the interrupt signal to the processor; a system memory that accumulates event information output from the host controller apparatus; and a processor that receives the interrupt signal output from the host controller apparatus, and executes the event based on the event information accumulated in the system memory based on the interrupt signal.

By using such an information processing apparatus, the occurred event information can be output to the system memory in synchronization with a timing at which the interrupt signal is output to the processor. Accordingly, it is possible to reduce a frequency to access the system memory caused by the output of the event information, thereby being able to achieve power saving in the information processing apparatus.

A third aspect of the present invention is an event information output method including: when occurred event information is output to a system memory, determining whether an interrupt signal output timer is started, the interrupt signal output timer indicating a timing at which an interrupt signal is to be output to a processor, and outputting the occurred event information to the system memory in synchronization with the interrupt signal output timer when the interrupt signal output timer is started.

By using such an event information output method, the occurred event information can be output to the system memory in synchronization with a timing at which the interrupt signal is output to the processor. Accordingly, it is possible to reduce a frequency to access the system memory caused by the output of the event information, thereby being able to achieve power saving in the host controller apparatus used for this event information output method.

According to the present invention, it is possible to provide a host controller apparatus, an information processing apparatus, and an event information output method that are capable of outputting event information to a system memory while achieving power saving.

BRIEF DESCRIPTION OF THE DRAWINGS

The above and other aspects, advantages and features will be more apparent from the following description of certain embodiments taken in conjunction with the accompanying drawings, in which.

DETAILED DESCRIPTION

First Embodiment

Figure 1:
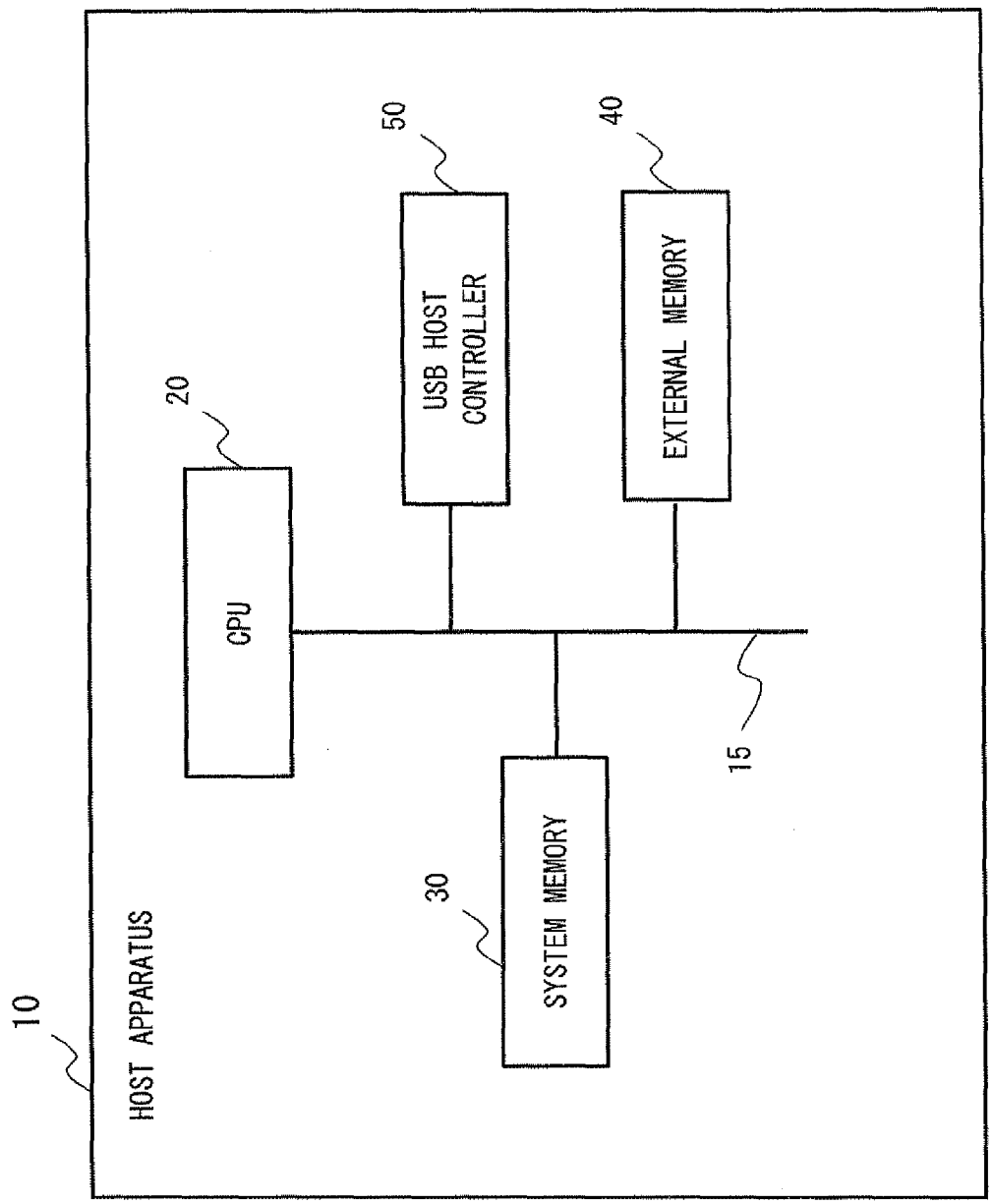
FIG. 1 is a configuration diagram of a host apparatus according to a first embodiment.

Hereinafter, embodiments of the present invention will be described with reference to the drawings. Referring to FIG. 1, a configuration example of a host apparatus according to a first embodiment of the present invention will be described. A host apparatus 10 may be a personal computer, a notebook personal computer or the like, for example, and is capable of connecting a USB device.

The host apparatus 10 includes a CPU 20, a system memory 30, an external memory 40, and a USB host controller 50. Further, the CPU 20, the system memory 30, the external memory 40, and the USB host controller 50 are connected via a system bus 15.

The CPU 20 is one example of a processor that controls information processing in the host apparatus 10. The CPU 20 executes processing contents (processing programs) recorded in the system memory 30. The system memory 30 includes a random access memory (RAM) or the like, for example. The external memory 40 may be a hard disk drive, an optical disk drive or the like. Text data, speech data, video data and the like may be recorded in the external memory 40.

The USB host controller 50 is used to connect a USB device unit to the host apparatus 10. The USB host controller 50 outputs a signal or data output from the CPU 20 to the USB device unit, and outputs a signal or data output from the USB device unit to the CPU 20 or the system memory 30. In short, the USB host controller 50 mediates communication between the CPU 20 and the system memory 30, and the USB device unit.

Figure 2:
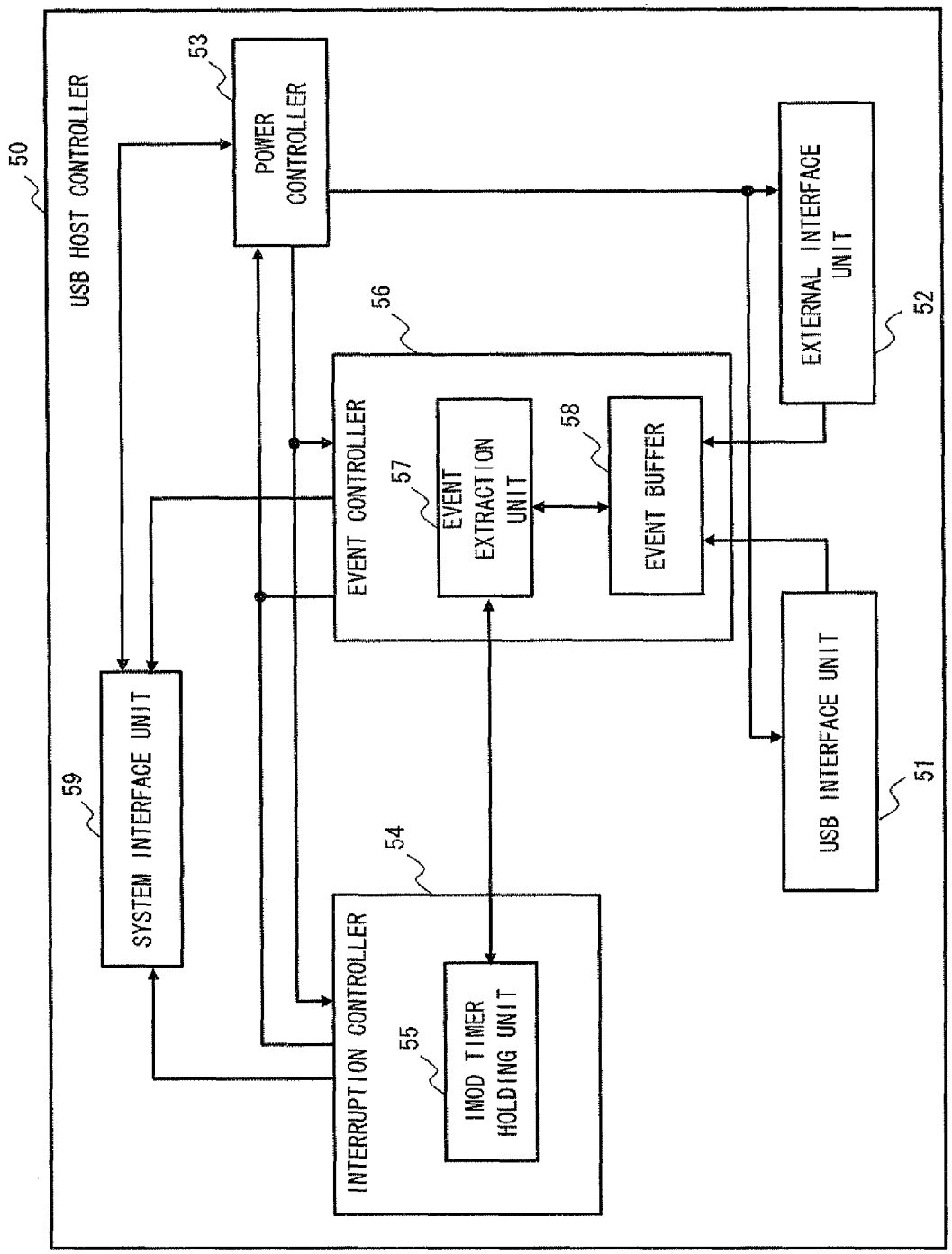
FIG. 2 is a configuration diagram of a USB host controller according to the first embodiment.

Next, with reference to FIG. 2, a configuration example of the USB host controller 50 according to the first embodiment of the present invention will be described. The USB host controller 50 includes a USB interface unit 51, an external interface unit 52, a power controller 53, an interruption controller 54, an IMOD timer holding unit 55, an event controller 56, an event extraction unit 57, an event buffer 58, and a system interface unit 59.

The USB interface unit 51 performs data transfer with the USB device unit connected to a Downport. Specifically, data transfer from the host apparatus 10 to the USB device unit, and data transfer from the USB device unit to the host apparatus 10 are performed through the USB interface unit 51. The data transferred between the host apparatus 10 and the USB device unit may be text data, image data or the like, or may be control data used to control operations of the USB device unit, for example. The USB interface unit 51 outputs event information to the event controller 56 upon occurrence of data transfer from the USB device unit to the host apparatus 10, for example.

The external interface unit 52 is used to perform power control (VBUS control) to the USB device unit, for example. The external interface unit 52 detects that the USB device unit has been connected to the USB host controller 50, and that the connection with the USB device unit has been released. Further, the external interface unit 52 also detects a failure or the like occurred between the USB host controller 50 and the USB device unit in a state in which the USB device unit is connected. The external interface unit 52 outputs event information to the event controller 56 upon detection of connection with the USB device unit, release of the connection with the USB device unit, or a failure of connection with the USB device unit.

The power controller 53 controls power supply to each component in the USB host controller 50. For example, the power controller 53 stops power supply to each component or decreases electric energy that is to be supplied when the USB host controller 50 makes a transition to a low power consumption mode or a power saving mode.

The interruption controller 54 outputs an interrupt signal to the CPU 20 through the system interface unit 59. The interrupt signal is a signal output to the CPU 20 in order to request processing of an event occurred in the USB host controller 50.

Upon receiving the interrupt signal, the CPU 20 executes processing according to the event information recorded in the system memory 30.

The interruption controller 54 includes the IMOD timer holding unit 55. The IMOD timer holding unit 55 holds an IMOD timer indicating an output timing of the interrupt signal. The interruption controller 54 is able to output the interrupt signal to the CPU 20 after a period defined by the IMOD timer elapses. Due to this, the interrupt signal is not notified to the CPU 20 in the period defined by the IMOD timer. Accordingly, it is possible to reduce a frequency that the CPU 20 receives the interrupt signal, thereby capable of suppressing a processing load of the CPU 20. Further, the interruption controller 54 outputs information regarding the IMOD timer to the event controller 56.

The IMOD timer is started at the timing at which the interrupt signal is output from the interruption controller 54, i.e., immediately after the interrupt signal is output from the interruption controller 54. The IMOD timer times out after a predetermined period elapses. Upon receiving information regarding occurrence of an event from the event controller 56 in a state in which the IMOD timer is not started, the interruption controller 54 outputs the interrupt signal. Further, upon receiving information regarding occurrence of an event from the event controller 56 in a state in which the IMOD timer is started, the interruption controller 54 outputs the interruption signal after the IMOD timer times out.

The event controller 56 includes the event extraction unit 57 and the event buffer 58. The event buffer 58 receives and accumulates event information output from the USB interface unit 51 and the external interface unit 52. Further, the event buffer 58 may receive event information occurred within the USB host controller 50 from other devices than the USB interface unit 51 and the external interface unit 52 to accumulate the event information.

The event extraction unit 57 extracts event information accumulated in the event buffer 58, and outputs the event information to the system memory 30 through the system interface unit 59. The system memory 30 includes an area in which the event information is accumulated (hereinafter referred to as an Event Ring), and the event information output from the event extraction unit 57 is accumulated in the Event Ring. The system memory 30 updates the Event Ring every time it receives event information from the event extraction unit 57 to accumulate the received event information.

The event extraction unit 57 receives information regarding the IMOD timer output from the IMOD timer holding unit 55. The information regarding the IMOD timer includes information regarding whether the IMOD timer is started, and timing information regarding the timing at which the IMOD timer times out.

When the IMOD timer is not started, the event extraction unit 57 extracts the event information accumulated in the event buffer 58, and outputs the event information to the system memory 30. When the IMOD timer is started and the IMOD timer does not time out, the event extraction unit 57 does not output the event information to the system memory 30. In summary, the event information is accumulated in the event buffer 58 for a predetermined period. When the IMOD timer is started and the IMOD timer times out, the event extraction unit 57 extracts the event information accumulated in the event buffer 58, and outputs the event information to the system memory 30.

The system interface unit 59 is connected to the system bus 15. The system interface unit 59 receives data that is output from the host apparatus 10 through the system bus 15. Further, the system interface unit 59 outputs the interrupt signal output from the interruption controller 54 and the event information output from the event controller 56 to the CPU 20 and the system memory 30 through the system bus 15.

When the data transfer between the host apparatus 10 and the USB host controller 50 does not occur, i.e., when data does not flow in the system bus 15, the system interface unit 59 makes a transition to the low power consumption mode in order to suppress power consumption. The low power consumption mode may be called a power saving mode. Any one of the low power consumption mode and the normal power mode is set in the system interface unit 59, and the system interface unit 59 operates according to the mode. In the low power consumption mode, the system interface unit 59 is operated by low power consumption compared to the normal power mode, and the low power consumption mode includes a state in which the operation stops with no electric power supplied. In the normal power mode, the system interface unit 59 is operated by larger power consumption compared to the low power consumption mode. Further, a plurality of modes may be set between the low power consumption mode and the normal power mode according to the electric energy that is consumed.

The system interface unit 59 is supplied with power from the power controller 53. The system interface unit 59 may operate in the normal power mode only when there is data output to the CPU 20 or the system memory 30, and may operate in the low power consumption mode in other cases, for example. In this case, when the power controller 53 receives the message from the interruption controller 54 that the interrupt signal is to be output, the power controller 53 may supply power to the system interface unit 59 to allow the system interface unit 59 to make a transition to the normal power mode. Further, upon receiving the message that the event information is to be output from the event controller 56, the power controller 53 may supply power to the system interface unit 59 to allow the system interface unit 59 to make a transition to the normal power mode. When the power controller 53 does not receive any message from the interruption controller 54 and the event controller 56 that the interrupt signal and the event information are to be output, the power controller 53 may reduce or stop power supplied to the system interface unit 59 to allow the system interface unit 59 to make a transition to the low power consumption mode.

Figure 3:
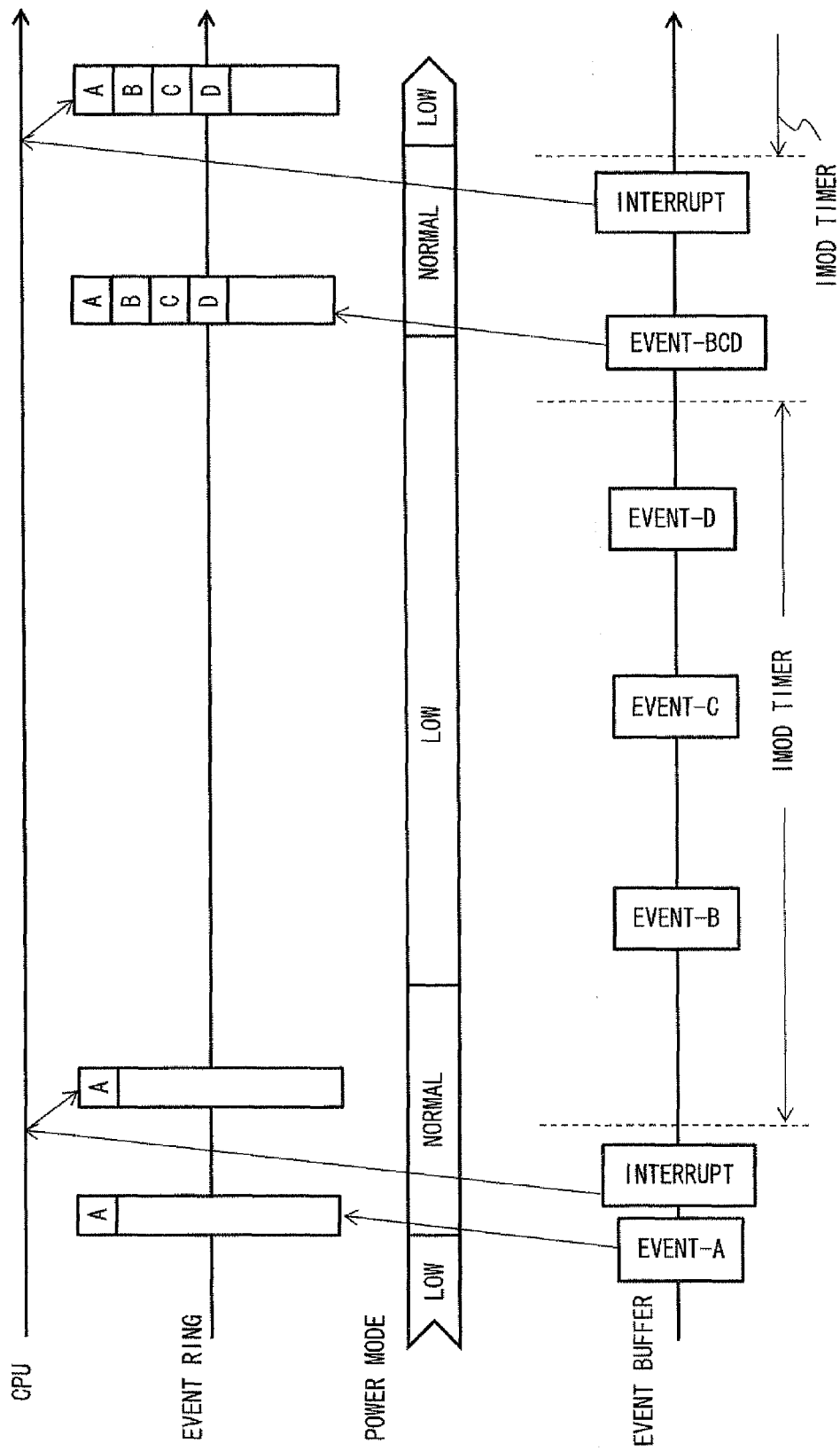
FIG. 3 is a diagram showing an operation of the USB host controller according to the first embodiment.

Subsequently, with reference to FIG. 3, an operational example of the USB host controller 50 according to the first embodiment of the present invention will be described. In FIG. 3, Power Mode indicates a mode in which the system interface unit 59 operates. Low indicates the low power consumption mode, and Normal indicates the normal power mode. Further, FIG. 3 shows a state in which events A, B, C, and D occur, and a state in which the event information is accumulated in the event buffer 58.

First, the IMOD timer does not start at a stage in which the event A has occurred. Accordingly, the event controller 56 outputs the information regarding the event A to the system memory 30 to update the Event Ring. At this time, the system interface unit 59 is operated in the normal power mode. The interruption controller 54 outputs the interrupt signal (Interrupt) to the CPU 20 after the information regarding the event A is output, to start the IMOD timer.

Upon receiving the interrupt signal, the CPU 20 executes processing regarding the event A accumulated in the system memory 30. When the interrupt signal and the event information are not output any more, the system interface unit 59 makes a transition from the normal power mode to the low power consumption mode.

At a stage in which the event B has occurred, the IMOD timer is started and the IMOD timer does not time out. Accordingly, the information regarding the event B is accumulated in the event buffer 58, and is not output to the system memory 30. The events C and D are not output to the system memory 30 but are accumulated in the event buffer 58 as well. After the IMOD timer times out, the event extraction unit 57 outputs the information regarding the events B, C, and D to the system memory 30, and updates the Event Ring. At this time, the system interface unit 59 operates after it makes a transition from the low power consumption mode to the normal power mode.

Since the information regarding the events B, C, and D is output, the interruption controller 54 outputs the interrupt signal to the CPU 20. Since the interruption controller 54 outputs the interrupt signal, the IMOD timer starts again.

Figure 4:
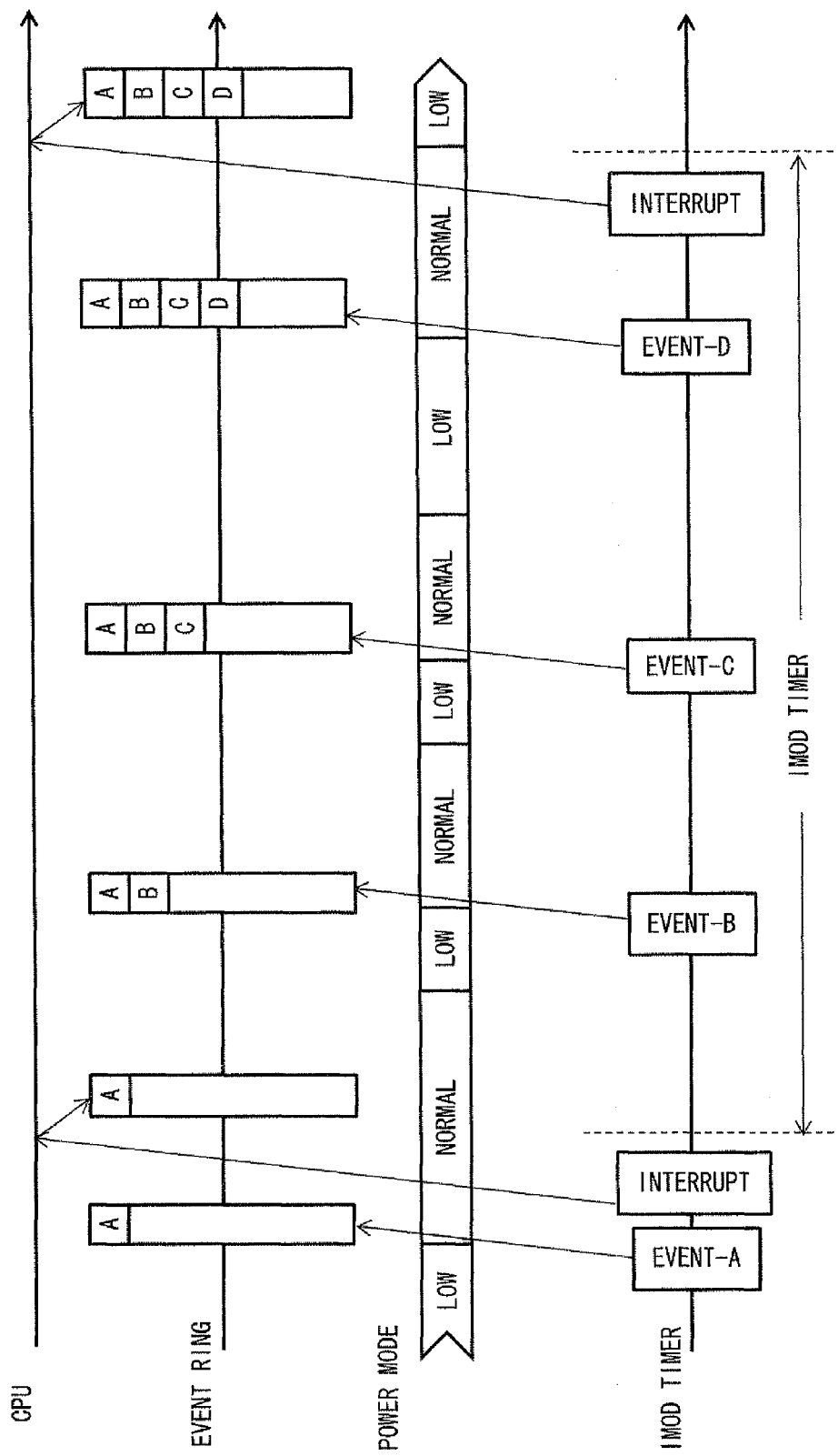
FIG. 4 is a diagram showing an operation of the USB host controller according to the first embodiment.

Now, with reference to FIG. 4, an operational example will be described in which the Event Ring is updated every time the event occurs before the present invention is applied. In FIG. 4, according to the occurrence of the events B, C, and D, the event extraction unit 57 outputs the event information to the system memory 30, to update the Event Ring. Accordingly, the system interface unit 59 makes a transition to the normal power mode every time the event information is output to the system memory 30. In FIG. 4, the period in which the system interface unit 59 operates in the normal power mode is long compared to that in FIG. 3. Accordingly, it is apparent that power saving in the system interface unit 59 can be achieved by employing the present invention.

Subsequently, referring to FIG. 5, a flow of event information notification processing in the USB host controller 50 according to the first embodiment of the present invention will be described. First, event information occurred from the USB interface unit 51 and the external interface unit 52 is output to the event controller 56 (S11). The event information output from the USB interface unit 51 and the external interface unit 52 is accumulated in the event buffer 58.

Next, the event extraction unit 57 determines whether the IMOD timer is being activated (S12). Whether the IMOD timer is being activated is included in the information regarding the IMOD timer output from the interruption controller 54. When it is determined that the IMOD timer is being activated, the event extraction unit 57 does not extract event information, but keeps a state in which the event information is stored in the event buffer 58 (S13).

Next, the event extraction unit 57 determines whether the IMOD timer times out (S14). Whether the IMOD timer times out is included in the information regarding the IMOD timer output from the interruption controller 54. When it is determined that the IMOD timer times out, the event extraction unit 57 extracts the accumulated event information from the event buffer 58 and outputs the event information to the system memory 30 (S15).

Next, the interruption controller 54 outputs the interrupt signal to the CPU 20 in order to execute the event information output to the system memory 30 (S16). Next, the interruption controller 54 starts the IMOD timer (S17).

In step S12, when the event extraction unit 57 determines that the IMOD timer is not started, the event extraction unit 57 does not execute processing of steps S13 and S14, but executes processing of step S15. Further, when it is determined that the IMOD timer does not time out in step S14, the event extraction unit 57 repeats the processing of step S13.

As described above, by use of the USB host controller 50 according to the first embodiment of the present invention, the event information is output to the system memory 30 in synchronization with the timing at which the interrupt signal is output. In summary, when a plurality of pieces of event information are accumulated in the event buffer 58, the plurality of pieces of event information are collectively output to the system memory 30 after the IMOD timer times out. Accordingly, the frequency to access the system memory 30 from the USB host controller 50 decreases. Accordingly, it is possible to reduce the time during which the system interface unit 59 is operated in the normal power mode and to increase the time during which it is operated in the low power consumption mode, thereby being able to achieve low power consumption of the USB host controller 50.

Second Embodiment

Next, with reference to FIG. 6, a configuration example of a USB host controller 60 according to a second embodiment of the present invention will be described. The USB host controller 60 includes a USB interface unit 51, an external interface unit 52, a power controller 53, a system interface unit 59, an interruption controller 61, and an event controller 63. The USB interface unit 51, the external interface unit 52, the power controller 53, and the system interface unit 59 are the same to the configurations included in the USB host controller 50 described with reference to FIG. 2; detailed description will be omitted.

Figure 6:
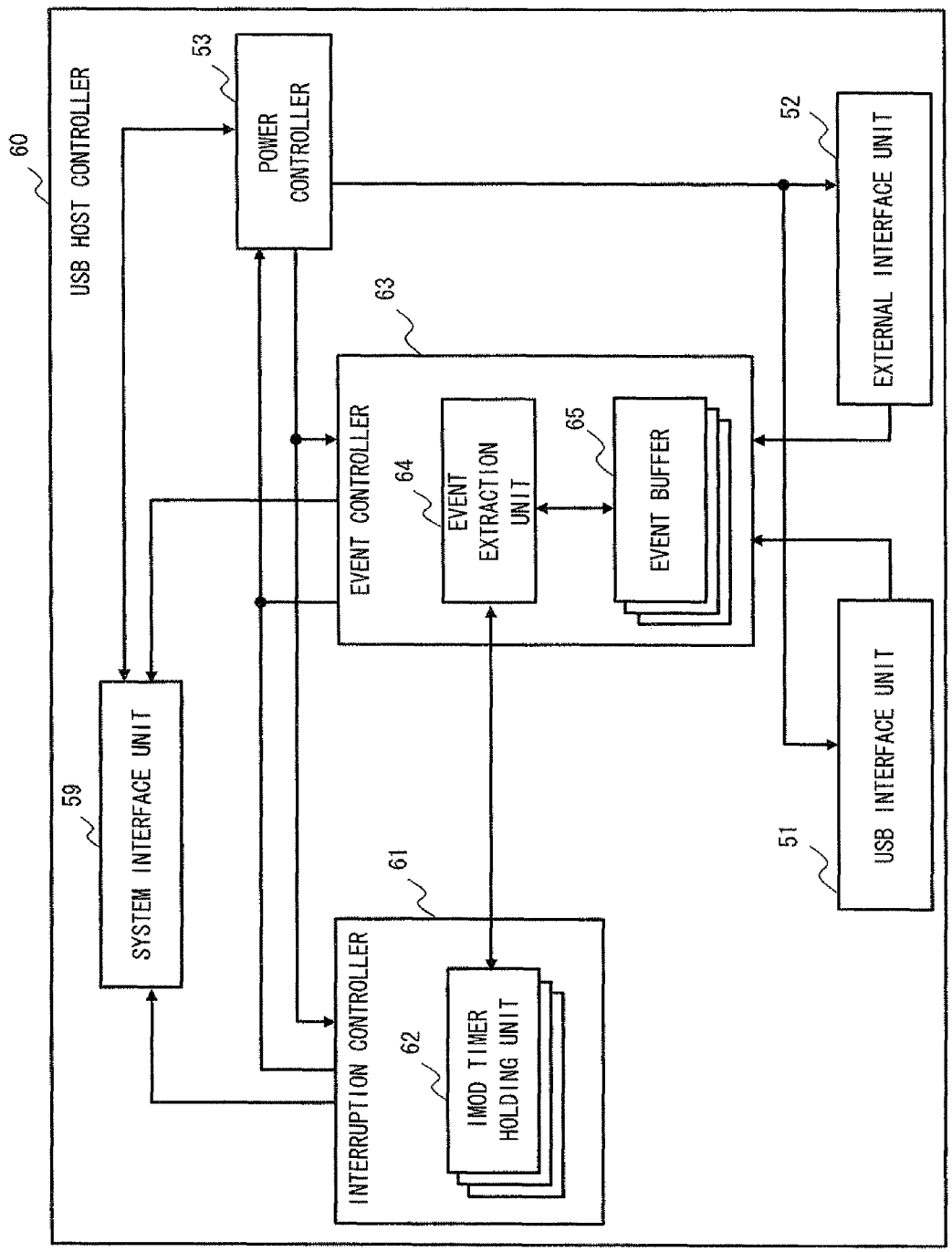
FIG. 6 is a configuration diagram of a USB host controller according to a second embodiment.

The interruption controller 61 in FIG. 6 includes a plurality of IMOD timer holding units 62. Further, the event controller 63 includes an event extraction unit 64 and a plurality of event buffers 65. The IMOD timer holding unit 62 holds an IMOD timer in each event buffer 65. Thus, the interruption controller 61 includes the same number of IMOD timer holding units 62 as the number of event buffers 65. Alternatively, one IMOD timer holding unit 62 may manage a plurality of IMOD timers.

Figure 7:
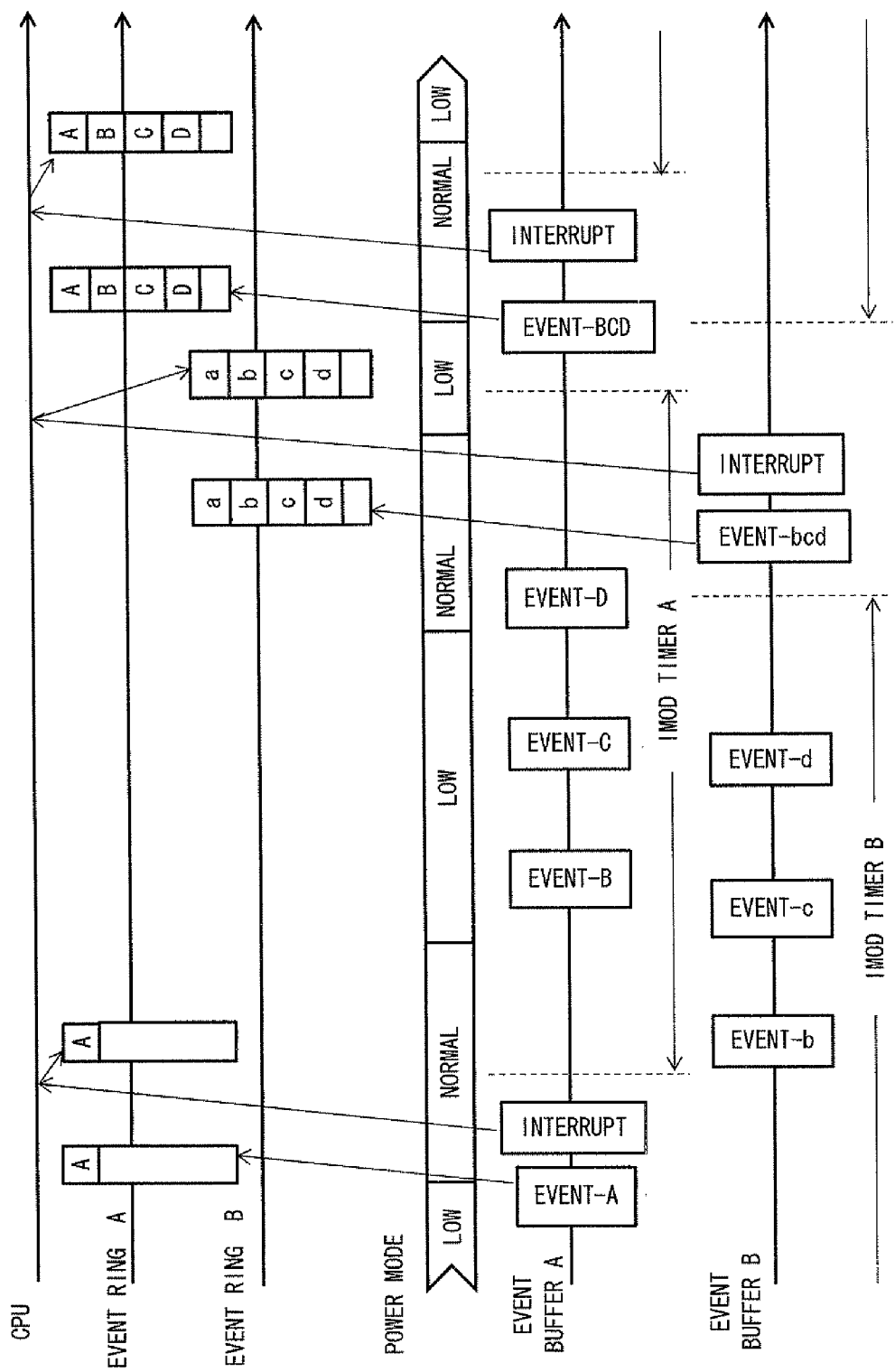
FIG. 7 is a diagram showing an operation of the USB host controller according to the second embodiment.

The event extraction unit 64 extracts event information from each of the plurality of event buffers 65 to output the event information to the system memory 30. Now, with reference to FIG. 7, an operational example of the USB host controller 60 will be described. FIG. 7 shows an example in which the event controller 63 includes two event buffers 65. In the following description, two event buffers are denoted by an event buffer A and an event buffer B. Further, an IMOD timer used in the event buffer A is denoted by an IMOD timer A, and an IMOD timer used in the event buffer B is denoted by an IMOD timer B.

In the event buffer A, the event A occurred before the IMOD timer A is started is immediately output to the system memory 30, and an interrupt signal is also output to the CPU 20. After the interrupt signal is output, the IMOD timer A is started. The events B, C, and D occurred while the IMOD timer A is being activated are collectively output to the system memory 30 after the IMOD timer A times out, and the Event Ring A is updated. After the Event Ring A is updated, the interrupt signal is notified to the CPU 20, and the IMOD timer A is started again.

The event buffer B indicates a state in which the IMOD timer B is already started. The events b, c, and d occurred while the IMOD timer B is being activated are collectively output to the system memory 30 after the IMOD timer B times out. Thus, the Event Ring B is updated. The Event Ring A described above is an area to accumulate the event information accumulated in the event buffer A, and the Event Ring B is an area to accumulate the event information accumulated in the event buffer B.

In FIG. 7, the IMOD timer A and the IMOD timer B operate at different timings. This is because each event held in the event buffers A and B occurs at any desired timing, and in accordance therewith, the IMOD timer A and the IMOD timer B are started at different timings.

As described above, by use of the USB host controller 60 according to the second embodiment of the present invention, the IMOD timer can be managed for each event buffer even when there are included a plurality of event buffers. Accordingly, the frequency that the USB host controller 60 accesses the system memory 30 is reduced. This makes it possible to reduce the time during which the system interface unit 59 is operated in the normal power mode and to increase the time during which it is operated in the low power consumption mode, thereby being able to achieve low power consumption of the USB host controller 60.

Third Embodiment

Next, with reference to FIG. 8, an operational example of a USB host controller according to a third embodiment of the present invention will be described. The USB host controller according to the third embodiment uses the USB host controller 60 shown in FIG. 6.

Figure 8:
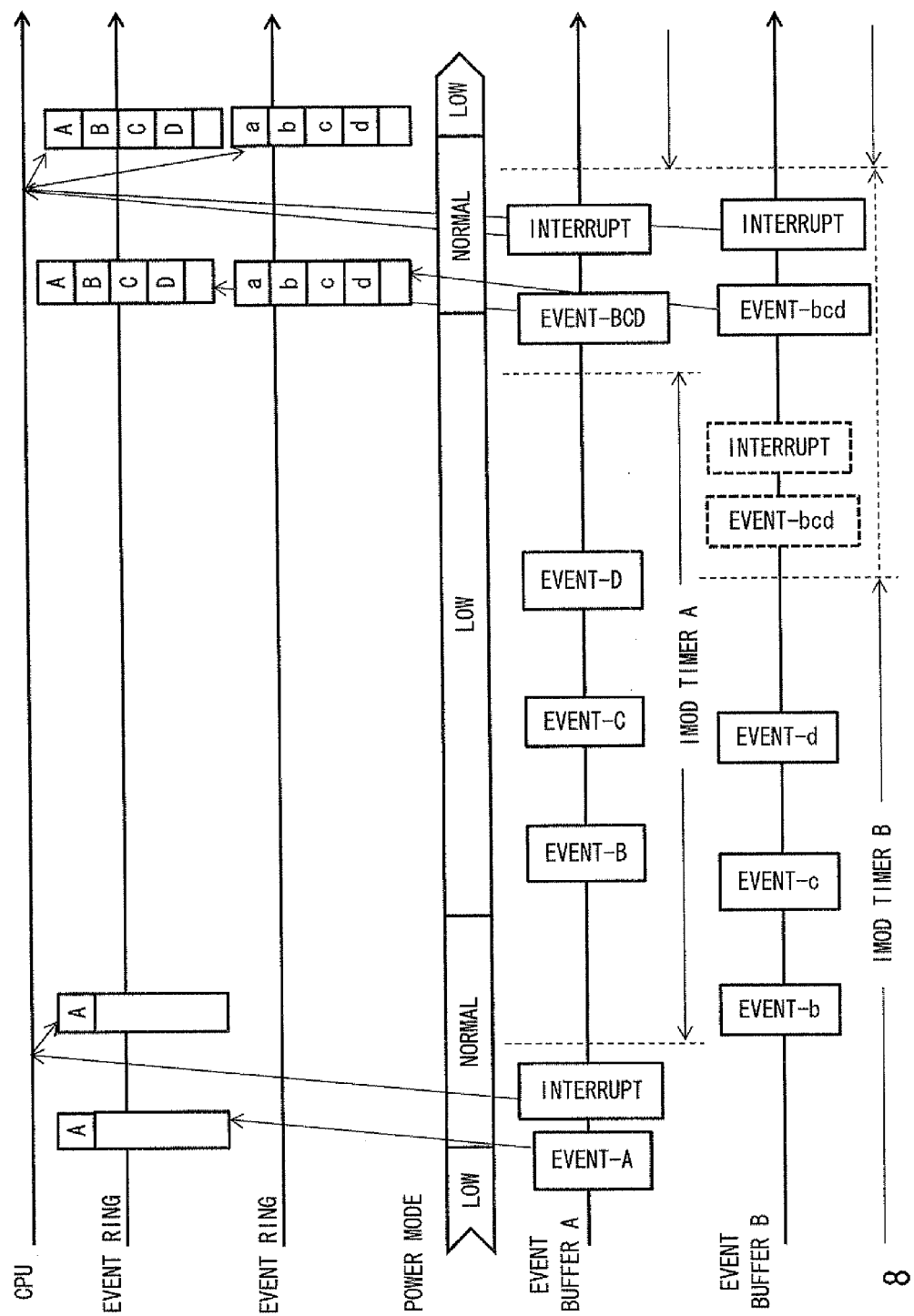
FIG. 8 is a diagram showing an operation of a USB host controller according to a third embodiment.

FIG. 8 shows a state in which the IMOD timer B of the event buffer B starts prior to the IMOD timer A. According to the second embodiment, the events b, c, and d occurred while the IMOD timer B is being activated in the event buffer B are output to the system memory 30 after the IMOD timer B times out. Meanwhile, according to the third embodiment, the events b, c, and d accumulated in the event buffer B are output to the system memory 30 after the IMOD timer A times out, not after the IMOD timer B times out. In summary, the events b, c, and d and the events B, C, and D occurred while the IMOD timer A is being activated are output to the system memory 30 at the same timing. Further, according to this operation, the interrupt signal is also output to the CPU 20 at the same timing.

Figure 9:
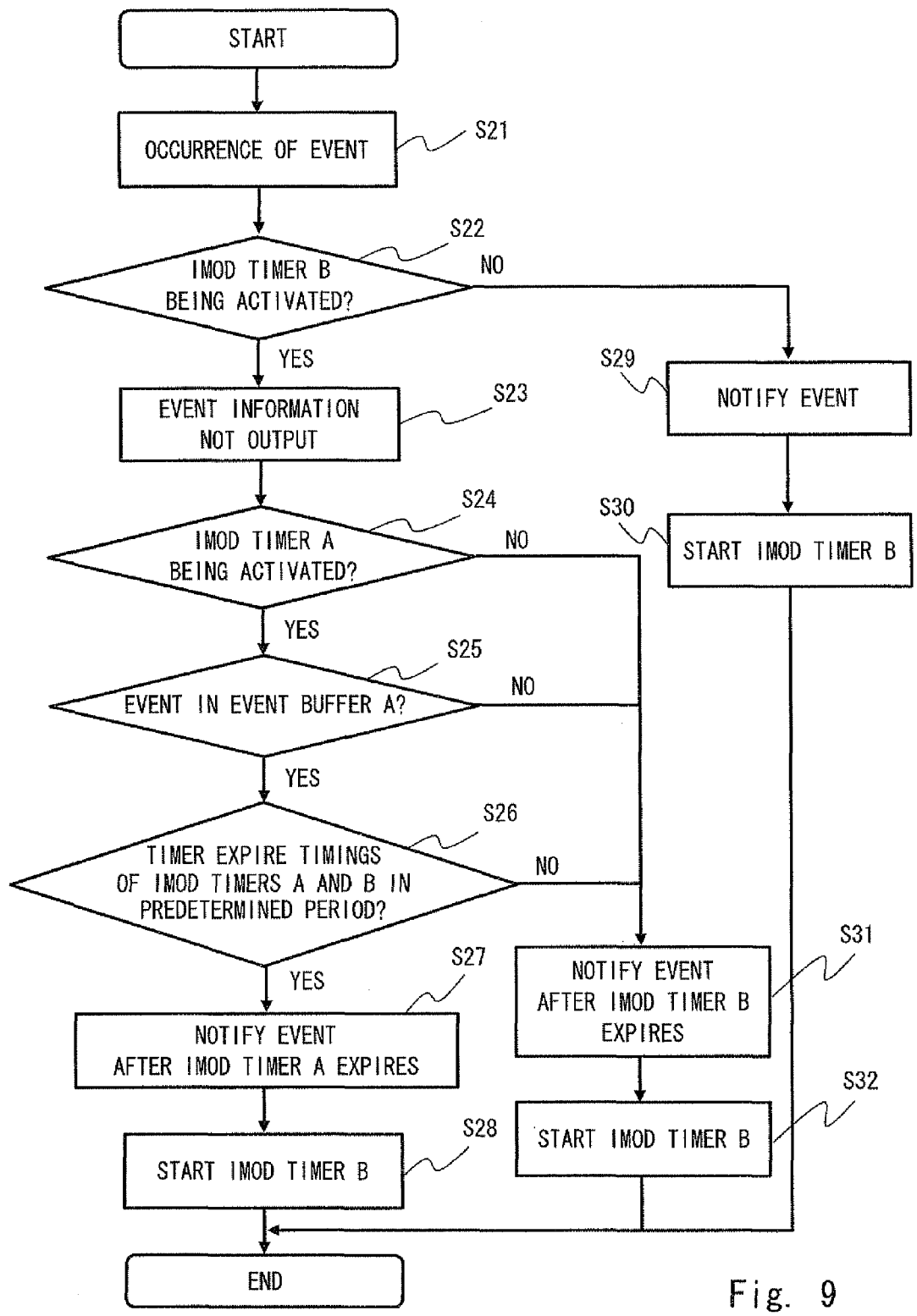
FIG. 9 is a flow chart of event information notification processing in the USB host controller according to the third embodiment.

Subsequently, with reference to FIG. 9, a flow of event information notification processing in the USB host controller 50 according to the third embodiment of the present invention will be described. At first, the event information occurred in the USB interface unit 51 and the external interface unit 52 is output to the event controller 56 (S21). It is assumed here that the event information that should be accumulated in the event buffer B has occurred. Thus, the event information that occurs is accumulated in the event buffer B.

Next, the event extraction unit 64 determines whether the IMOD timer B is being activated (S22). Whether the IMOD timer B is being activated is included in the information regarding the IMOD timer B output from the interruption controller 61. When it is determined that the IMOD timer B is being activated, the event extraction unit 64 does not extract the event information but keeps a state in which the event information is stored in the event buffer B (S23).

Next, the event extraction unit 64 determines whether the IMOD timer A is being activated (S24). Whether the IMOD timer A is being activated is included in the information regarding the IMOD timer A output from the interruption controller 61. When it is determined that the IMOD timer A is being activated, the event extraction unit 64 determines whether the event information is accumulated in the event buffer A (S25).

When it is determined that the event information is accumulated in the event buffer A, the event extraction unit 64 determines whether the time out timings of the IMOD timer A and the IMOD timer B are in a predetermined period (S26). Specifically, it is determined whether the IMOD timer A times out before a lapse of a predetermined period after the IMOD timer B times out.

When it is determined that the time out timings of the IMOD timer A and the IMOD timer B are within a predetermined period, the event extraction unit 64 outputs the event information accumulated in the event buffer B to the system memory 30 after the IMOD timer B times out and further the IMOD timer A times out (S27). In summary, the event extraction unit 64 outputs the event information accumulated in the event buffer B to the system memory 30 after the IMOD timer A times out, not after the IMOD timer B times out.

Next, the interruption controller 61 starts the IMOD timer B again after it outputs the interrupt signal to the CPU 20 (S28). Further, the interruption controller 61 starts the IMOD timer A again with the IMOD timer B.

In step S22, when the event extraction unit 64 determines that the IMOD timer B is not being activated, it outputs the event information accumulated in the event buffer B to the system memory 30 (S29). Next, the interruption controller 61 starts the IMOD timer B after it outputs the interrupt signal to the CPU 20 (S30).

In step S24, when the event extraction unit 64 determines that the IMOD timer A is not being activated, it outputs the event information accumulated in the event buffer B to the system memory 30 after the IMOD timer B times out (S31). Next, the interruption controller 61 starts the IMOD timer B after it outputs the interrupt signal to the CPU 20 (S32).

In step S25, when the event extraction unit 64 determines that the event information is not accumulated in the event buffer A, it executes processing of step S31. Further, in step S26, the event extraction unit 64 also executes processing of step S31 also when the time out timings of the IMOD timer A and the IMOD timer B are not within a predetermined period.

As described above, by determining whether the IMOD timer A is being activated in step S24, it can be selected whether to output the event information accumulated in the event buffer B after the IMOD timer A times out or to output the event information after the IMOD timer B times out.

Further, when the event information is not accumulated in the event buffer A even when the IMOD timer A is being activated, the event information accumulated in the event buffer A is not output to the system memory 30 after the IMOD timer A times out. Accordingly, it is determined in step S25 whether the event information is accumulated in the event buffer A, and it is selected whether to output information accumulated in the event buffer B with the event information accumulated in the event buffer A after the IMOD timer A times out or to output the information accumulated in the event buffer B after the IMOD timer B times out.

Further, even when the IMOD timer A is being activated and the event information is accumulated in the event buffer A, if long time elapses before the IMOD timer A times out after the IMOD timer B times out, a problem occurs that processing of the event information accumulated in the event buffer B is not executed for a long time and is left. In order to solve this problem, in step S26, it is determined whether the IMOD timer A times out within the allowed time during which processing of the event information accumulated in the event buffer B can be left without being executed after the IMOD timer B times out.

As described above, it is possible to increase the time during which the system interface unit 59 is operated in the low power consumption mode compared to the operational example of the USB host controller 60 according to the second embodiment of the present invention. Accordingly, lower power consumption may be achieved compared to the USB host controller according to the second embodiment.

Fourth Embodiment

Figure 10:
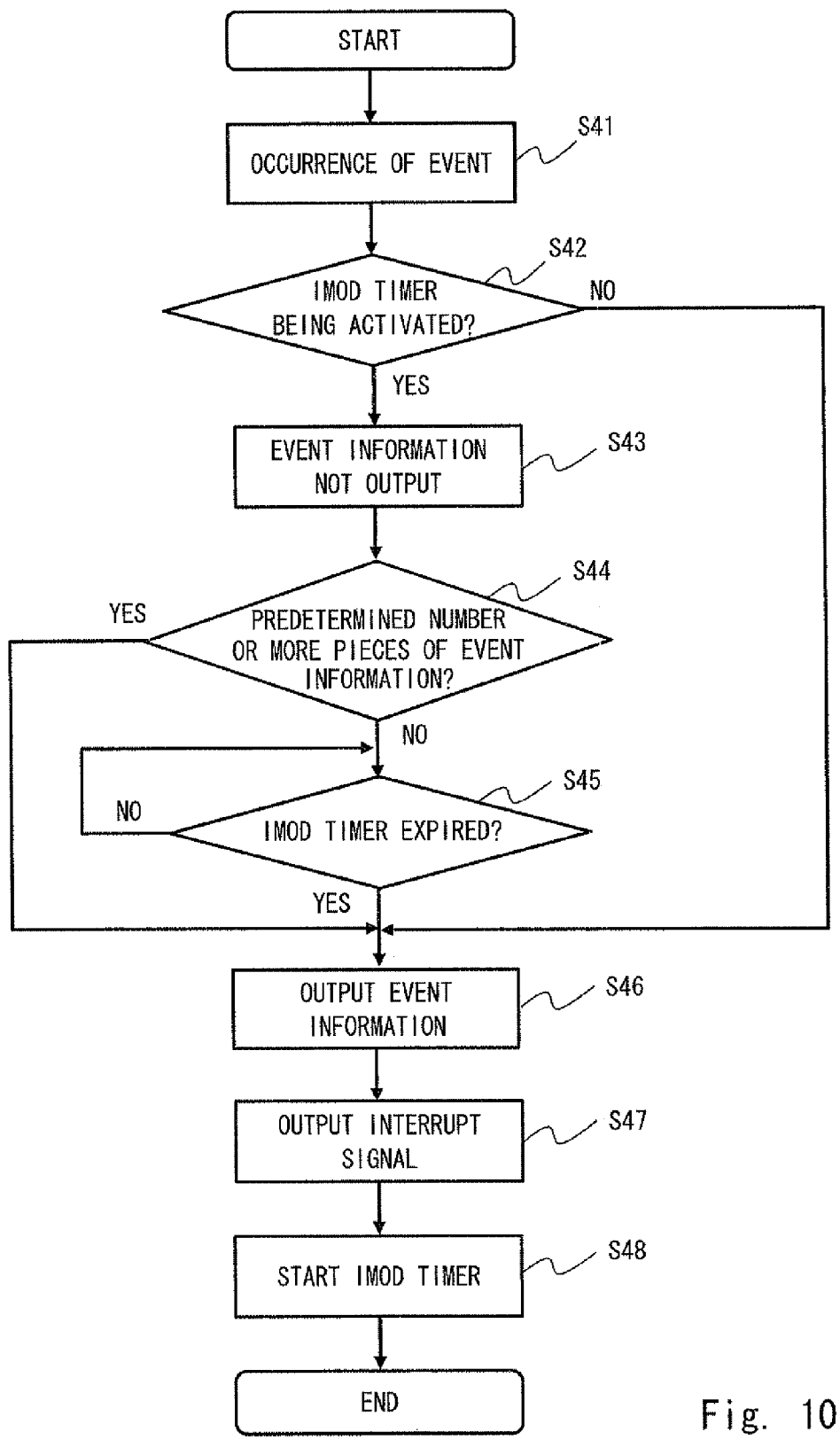
FIG. 10 is a flow chart of event information notification processing in a USB host controller according to a fourth embodiment.

Next, with reference to FIG. 10, an operational example of a USB host controller according to a fourth embodiment of the present invention will be described. The USB host controller according to the fourth embodiment uses the USB host controller 50 shown in FIG. 2.

Figure 5:
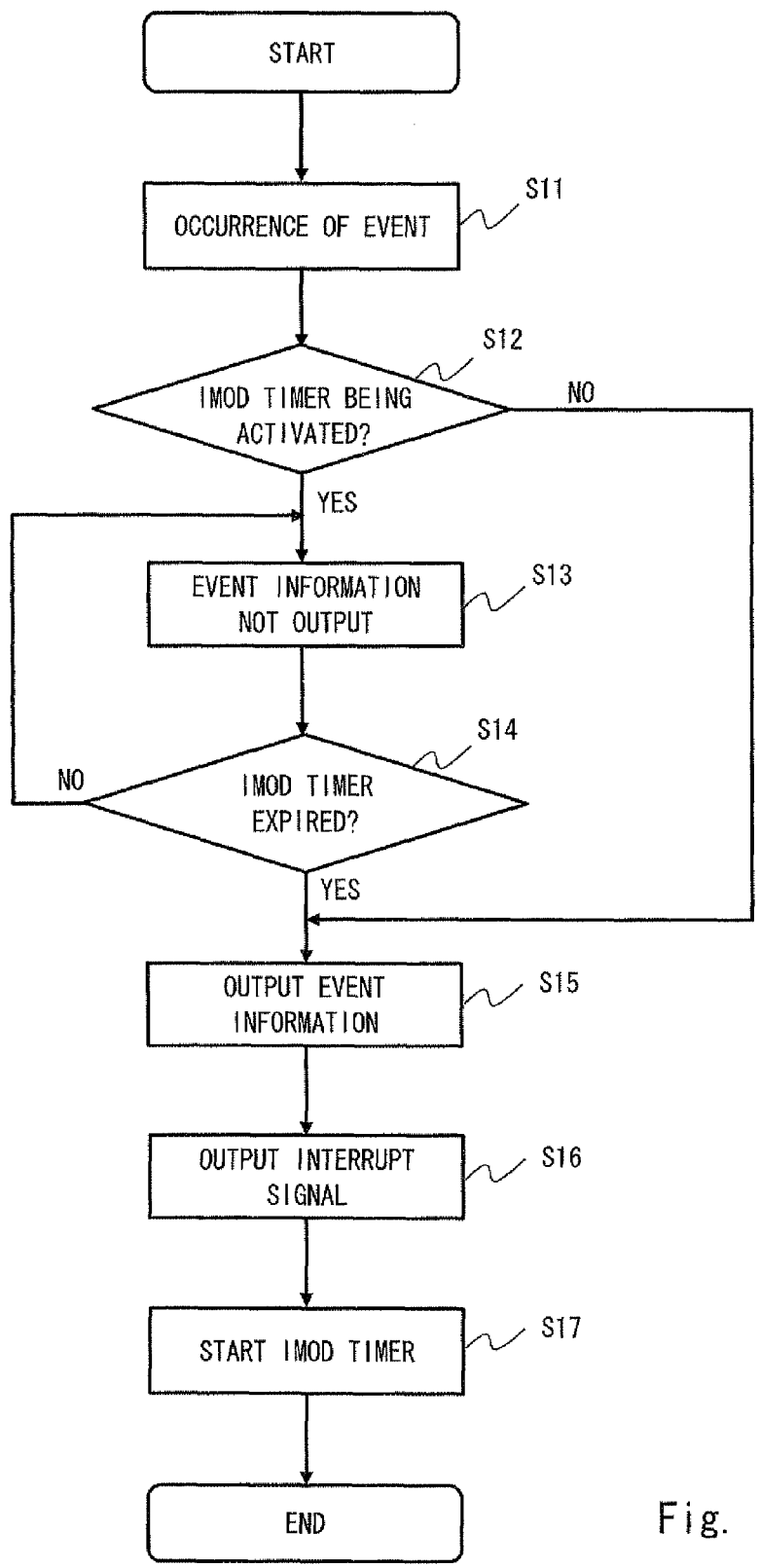
FIG. 5 is a flow chart of event information notification processing in the USB host controller according to the first embodiment.

Processing from steps S41 to S43 are the same to the processing from steps S11 to S13 in FIG. 5; detailed description will be omitted. Next, the event extraction unit 57 determines whether the number of pieces of event information accumulated in the event buffer 58 is a predetermined number or more (S44). The predetermined number used by the event buffer 58 as a threshold may be changed to any desired value. When it is determined that the number of pieces of event information accumulated in the event buffer 58 is not a predetermined number or more, the event extraction unit 57 determines whether the IMOD timer times out (S45). Whether the IMOD timer times out is included in the information regarding the IMOD timer output from the interruption controller 54. When it is determined that the IMOD timer does not time out, the event extraction unit 57 repeatedly executes the processing of step S45. When it is determined that the IMOD timer times out, the event extraction unit 57 extracts the accumulated event information from the event buffer 58 to output the event information to the system memory 30 (S46).

When it is determined that the IMOD timer is not being operated in step S42, the event extraction unit 57 does not execute processing of steps S43 to S45 but executes processing of step S46. Further, when it is determined in step S44 that the number of pieces of event information accumulated in the event buffer 58 is a predetermined number or more, the event extraction unit 57 does not execute processing of step S45 but executes processing of step S46. Processing of steps S47 and S48 is the same to the processing of steps S16 and S17 in FIG. 5; detailed description will be omitted.

As described above, the USB host controller 50 according to the fourth embodiment of the present invention is able to determine whether to output the event information to the system memory 30 according to the number of pieces of event information accumulated in the event buffer 58. When a large volume of event information is collectively output from the USB host controller 50 to the system memory 30, time occupying the system bus increases. To address with this problem, as described above, when the number of pieces of event information accumulated in the event buffer 58 reaches a predetermined number, the event extraction unit 57 outputs the event information accumulated in the event buffer 58 to the system memory 30 before the IMOD timer times out, thereby making it possible to control time occupying the system bus.

However, this technique is not appropriate when the event information is not output to the system memory 30 from the event extraction unit 57 before the number of pieces of event information accumulated in the event buffer 58 reaches a predetermined number since it increases time before events related to the event information accumulated in the event buffer 58 are executed. Thus, even when the number of pieces of event information accumulated in the event buffer 58 does not reach a predetermined number, it is determined whether the IMOD timer times out. When the IMOD timer times out, the event extraction unit 57 is able to output the event information to the system memory 30.

Accordingly, it is possible to increase the time during which the system interface unit 59 is operated in the low power consumption mode and to adjust the balance of occupied time by the system bus and time until when the event according to each event information is executed.

Note that the present invention is not limited to the embodiments described above, but may be changed as appropriate without departing from the spirit of the present invention. For example, processing of determining whether the event information can be output to the system memory 30 from the event extraction unit 57 according to the number of pieces of event information accumulated in the event buffer 58 according to the fourth embodiment may be executed in the third and fourth embodiments.

While the invention has been described in terms of several embodiments, those skilled in the art will recognize that the invention can be practiced with various modifications within the spirit and scope of the appended claims and the invention is not limited to the examples described above.

Further, the scope of the claims is not limited by the embodiments described above.

Furthermore, it is noted that, Applicant's intent is to encompass equivalents of all claim elements, even if amended later during prosecution.

The first, second, third and fourth embodiments can be combined as desirable by one of ordinary skill in the art.

What is claimed is:

1. A host controller apparatus comprising:
an event controller configured to output occurred event information to a system memory; and
an interruption controller configured to output an interrupt signal to a processor executing an event recorded in the system memory, the interrupt signal requesting execution of the event output from the event controller to the system memory;
wherein the event controller is configured to output the occurred event information to the system memory in synchronization with a timing at which the interruption controller outputs the interrupt signal to the processor,
wherein the interruption controller comprises an interrupt signal output timer configured to indicate a timing to output the interrupt signal, and the event controller comprises an event buffer configured to accumulate the occurred event information, and to output event information accumulated in the event buffer to the system memory in synchronization with the timing to output the interrupt signal from the interrupt signal output timer,
wherein the event controller is configured to output the event information that are accumulated to the system memory when a predetermined number of pieces of event information are accumulated in the event buffer.

2. The host controller apparatus according to claim 1, further comprising a system interface unit configured to communicate information with the system memory and the processor through a system bus, wherein the system interface unit is started when at least one of the event information and the interrupt signal is output to the system bus.

3. The host controller apparatus according to claim 2, further comprising a power controller configured to supply power to the system interface unit when at least one of the event information and the interrupt signal is output to the system bus.

4. The host controller apparatus according to claim 1, wherein the interrupt signal output timer is started after the event information accumulated in the event buffer is output to the system memory, and the interrupt signal is output to the system memory after the interrupt signal output timer expires.

5. The host controller apparatus according to claim 1, wherein the interruption controller comprises a plurality of interrupt signal output timers, and the event controller is configured to output a plurality of occurred events to the system memory in synchronization with one of the plurality of interrupt signal output timers.

6. The host controller apparatus according to claim 5, wherein the event controller comprises a plurality of event buffers, each of which being associated with any one of the plurality of interrupt signal output timers, and is configured to output event information accumulated in each of the event buffers to the system memory in synchronization with the signal output timers associated with the event buffers.

7. The host controller apparatus according to claim 6, wherein the plurality of interrupt signal output timers comprise a first interrupt signal output timer and a second interrupt signal output timer, and the event controller is configured to output event information accumulated in the event buffer associated with the first interrupt signal output timer to the system memory together with event information accumulated in the event buffer associated with the second interrupt signal output timer in synchronization with the second interrupt signal output timer.

8. An information processing apparatus comprising: the host controller apparatus according to claim 1; a system memory configured to accumulate event information output from the host controller apparatus; and a processor configured to receive an interrupt signal output from the host controller apparatus, and to execute an event based on event information accumulated in the system memory based on the interrupt signal.

9. An event information output method comprising:
when occurred event information is output to a system memory, determining whether an interrupt signal output timer is started, the interrupt signal output timer indicating a timing at which an interrupt signal is to be output to a processor, and outputting the occurred event information to the system memory in synchronization with the interrupt signal output timer when the interrupt signal output timer is started; and
when outputting occurred event information to the system memory, outputting accumulated event information to the system memory when a predetermined number of pieces of event info anon are accumulated in an event buffer accumulating the event information.

10. The event information output method according to claim 9, comprising when the event information is output to the system memory, starting a system interface unit that communicates information with the system memory and the processor through a system bus.

11. The event information output method according to claim 9, wherein the interrupt signal output timer is started after the event information is output to the system memory, and the interrupt signal is output to the system memory after the interrupt signal output timer expires.

12. The event information output method according to claim 9, comprising outputting a plurality of occurred events to the system memory in synchronization with any one of a plurality interrupt signal output timers.

13. The event information output method according to claim 12, wherein the plurality of interrupt signal output timers comprise a first interrupt signal output timer and a second interrupt signal output timer, and the method comprises outputting event information associated with the first interrupt signal output timer to the system memory together with the event information associated with the second interrupt signal output timer in synchronization with the second interrupt signal output timer.

14. A host controller apparatus comprising:
an event controller configured to output occurred event information to a system memory; and
an interruption controller configured to output an interrupt signal to a processor executing an event recorded in the system memory, the interrupt signal requesting execution of the event output from the event controller to the system memory;
wherein the event controller is configured to output the occurred event information to the system memory in synchronization with a timing at which the interruption controller outputs the interrupt signal to the processor,
wherein the interruption controller comprises an interrupt signal output timer configured to indicate a timing to output the interrupt signal, and the event controller comprises an event buffer configured to accumulate the occurred event information, to output event information accumulated in the event buffer to the system memory when it is determined that the interrupt signal output timer has not started or has timed out, and to not output event information accumulated in the event buffer to the system memory when it is determined that the interrupt signal output timer has started and has not timed out.

* * * * *